United States Patent
Parsons et al.

(10) Patent No.: US 6,609,698 B1
(45) Date of Patent: Aug. 26, 2003

(54) FERROMAGNETIC/FLUID VALVE ACTUATOR

(75) Inventors: Natan E. Parsons, Brookline, MA (US); Kay Herbert, Winthrop, MA (US)

(73) Assignee: Arichell Technologies, Inc., West Newton, MA (US)

( * ) Notice: Subject to any disclaimer, the term of this patent is extended or adjusted under 35 U.S.C. 154(b) by 0 days.

(21) Appl. No.: 09/696,154

(22) Filed: Oct. 25, 2000

(51) Int. Cl.[7] ............................................. F16K 31/02
(52) U.S. Cl. .............................. 251/129.17; 251/129.07
(58) Field of Search .................. 251/129.17, 129.07, 251/282; 277/926; 335/269, 257, 277

(56) References Cited

U.S. PATENT DOCUMENTS

| | | |
|---|---|---|
| 2,619,986 A | 12/1952 | Goepfrich et al. |
| 2,842,400 A | 7/1958 | Booth et al. |
| 3,098,635 A * | 7/1963 | Delaporte et al. .. 251/129.17 X |
| 3,369,205 A | 2/1968 | Hamrick |
| 3,606,241 A * | 9/1971 | Bornholdt .......... 251/129.17 X |
| 3,740,019 A * | 6/1973 | Kessell et al. ......... 251/129.17 |
| 3,802,462 A | 4/1974 | Trösch |
| 3,812,398 A | 5/1974 | Kozel et al. |
| 3,821,967 A | 7/1974 | Sturman |
| 4,010,769 A | 3/1977 | De Lorenzo et al. |
| 4,231,287 A | 11/1980 | Smiley |
| 4,280,680 A | 7/1981 | Payne |
| 4,295,485 A | 10/1981 | Waterfield |
| 4,295,653 A | 10/1981 | Coles |
| 4,304,391 A | 12/1981 | Yamaguchi |
| 4,383,234 A | 5/1983 | Yatsushiro et al. |
| 4,505,451 A | 3/1985 | Jonas |
| 4,597,895 A * | 7/1986 | Bartlett ........................ 252/392 |
| 4,609,178 A | 9/1986 | Baumann |
| 4,796,662 A | 1/1989 | Hoffmann et al. |
| 4,826,132 A | 5/1989 | Moldenhauer |
| 4,832,582 A | 5/1989 | Buffet |
| 4,910,487 A | 3/1990 | Kleinhappl |
| 4,921,208 A | 5/1990 | LaMarca |
| 4,932,430 A | 6/1990 | Fernstrom |
| 4,944,487 A | 7/1990 | Holtermann |
| 4,977,929 A | 12/1990 | Chinnock et al. |
| 4,988,074 A | 1/1991 | Najmolhoda |
| 5,127,625 A | 7/1992 | Kleinhappl |
| 5,188,337 A * | 2/1993 | Mertens et al. ......... 251/129.17 |
| 5,245,024 A * | 9/1993 | Scarpa et al. .................. 536/56 |
| 5,265,594 A | 11/1993 | Olsson et al. |
| 5,265,843 A * | 11/1993 | Kleinhappl ............. 251/129.17 |
| 5,474,303 A | 12/1995 | Coles ............................. 277/2 |
| 5,785,955 A * | 7/1998 | Fischer ......................... 424/49 |
| 5,900,201 A * | 5/1999 | Chatterjee et al. ........... 264/109 |
| 5,941,505 A | 8/1999 | Nagel ....................... 251/335.2 |

FOREIGN PATENT DOCUMENTS

| | | |
|---|---|---|
| EP | 0072681 B1 | 7/1986 |
| EP | 0230150 B1 | 10/1990 |
| EP | 0319618 B1 | 7/1992 |
| GB | 1064678 | 4/1967 |
| GB | 1417226 | 12/1975 |
| GB | 2103391 A | 2/1983 |
| WO | WO 85/05657 | 12/1985 |
| WO | WO 88/01705 | 5/1988 |

* cited by examiner

*Primary Examiner*—Gene Mancene
*Assistant Examiner*—Eric Keasel
(74) *Attorney, Agent, or Firm*—Cesari and McKenna, LLC

(57) ABSTRACT

An actuator base (16), bobbin (14), and pole piece (24) form a pocket for an armature (30) that a flexible membrane (40) encloses to form an armature chamber filled with an incompressible fluid. The membrane (40) protects the armature (30) from exposure to corrosive fluids flowing in a conduit (44). Conduit flow can be stopped by driving the membrane (40) against a valve seat (54). Pressure from the fluid in the conduit (44) is transmitted though the membrane to the fluid within the armature chamber so that the armature does not need to counteract force applied to the membrane (40) by the conduit fluid's pressure.

10 Claims, 1 Drawing Sheet

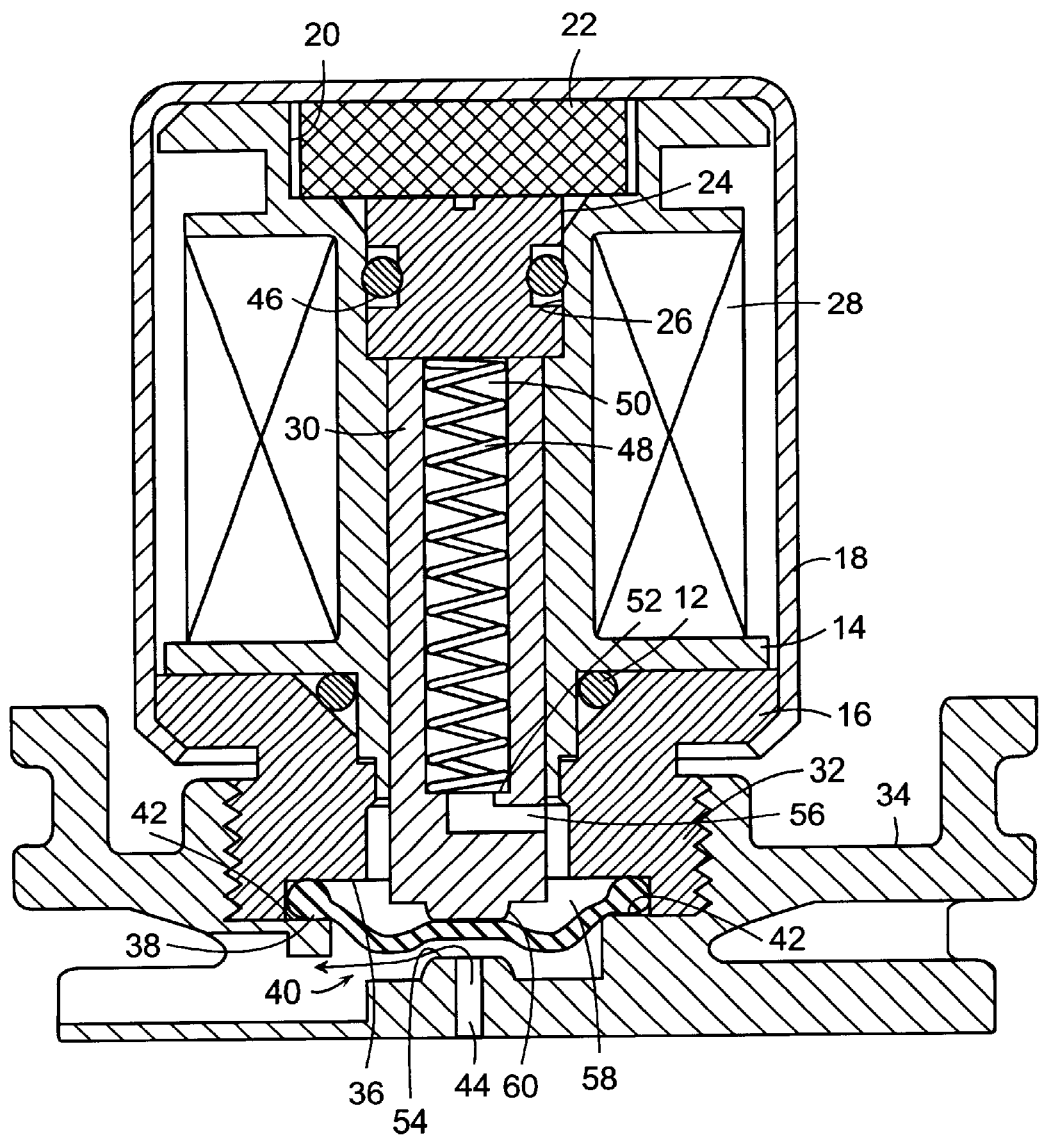

FERROMAGNETIC/FLUID VALVE ACTUATOR

BACKGROUND OF THE INVENTION

1. Field of the Invention

The present invention is directed to electromagnetic actuators. It finds particular, although not exclusive, application in valves employed to control liquid flow.

2. Background Information

The most common form of electrically operated valve employs a solenoid to drive a valve member into a valve seat and thereby stop flow through a conduit in which the valve seat is disposed. Although the tip of the valve member is in many cases made of a synthetic resin or other resilient material, most of the valve member is made up of a material of relatively high-magnetic-permeability material, such as steel, so that it will be subject to force from the solenoid's magnetic field and act as a solenoid armature.

There are many applications in which electric-valve-control circuitry should employ as little power as possible. To this end, it is best for the valve member, which acts as the solenoid's armature, to be as magnetically permeable as possible. But designers in the past have had to compromise permeability for corrosion resistance. Carbon steel, whose high magnetic permeability would otherwise make it desirable, is quite vulnerable to rust and corrosion. So designers have resorted to the higher-magnetic-permeability grades of stainless steel, even though stainless steel is less magnetically permeable than carbon steel.

Unfortunately, the ferromagnetic types of stainless steel tend not to be as corrosion-resistant as types of stainless that are not ferromagnetic, so the armature often needs to be subjected to a number of treatment steps to afford an acceptable level of corrosion resistance. These steps contribute to valve cost. Also contributing to cost is the greater solenoid-wire size required because the armature's permeability is not as great as that of carbon steel.

SUMMARY OF THE INVENTION

We have developed a simple approach to reducing the need to make such armature-material comprises. Specifically, we so secure a flexible membrane over the end of the pocket in which the armature travels as to protect the armature's high-permeability material from exposure to the possibly corrosive fluid whose flow the valve is to control. This would at first seem to impose a significant power cost, since it might be thought to subject the armature to the force imposed by the controlled fluid fluid's pressure. But we eliminate this problem by adapting to it an approach previously used in arrangements such as that of U.S. Pat. No. 5,941,505 to Nagel to prevent leaks in membranes that protect the controlled fluids from valve-assembly contaminants.

As in those arrangements, we fill the armature pocket with an incompressible fluid so as to counterbalance the force exerted by the controlled liquid's pressure. In contrast to those arrangements, though, we place the membrane in a position in which it protects at least the armature's ferromagnetic portion from the fluid being controlled, as was just mentioned.

BRIEF DESCRIPTION OF THE DRAWING

The invention description below refers to the accompanying drawing, which is a cross-sectional view of an electrically operated valve whose actuator embodies the present invention's teachings.

DETAILED DESCRIPTION OF AN ILLUSTRATIVE EMBODIMENT

The drawing depicts an electrically operable valve in which a resiliently deformable O-ring 12 forms a seal between a solenoid bobbin 14 and an actuator base 16 that a housing 18 holds together. At its upper end, the bobbin forms a magnet recess 20 in which housing 18 holds a disk-shaped magnet 22. That magnet in turn holds in place a ferromagnetic pole piece 24 disposed in a counterbore 26 that the bobbin 14's axial central cavity forms. Solenoid windings 28 are wound about the bobbin 14, which together with the base 16 acts as a housing for a ferromagnetic armature 30 slideably mounted in an armature pocket that the pole piece 24 forms with the surface of the bobbin 14's central cavity.

A narrowed base extension 32's outer surface threadedly engages complementary threads provided by a recess that a mounting block 34's upper surface forms. An annular surface 36 formed by a counterbore in the base extension 32's lower face squeezes a thickened peripheral rim 38 of a resiliently deformable membrane 40 against a shoulder 42 formed in the mounting block 34's upper recess. This creates a fluid-tight seal so that the membrane protects the armature 30 from exposure to fluid flowing in mounting block 34's interior fluid conduit 44. It also cooperates with an O-ring seal 46 to form a fluid-tight armature chamber filled with a liquid that preferably is relatively inviscid and non-corrosive. An example is water mixed with a corrosion inhibitor, e.g., a 20% mixture of polypropylene glycol and potassium phosphate. Because of this protection, the illustrated embodiment's armature material can be a low-carbon steel; corrosion resistance is not as big a factor as it would otherwise be. Other embodiments may employ armature materials such as the 420 or 430 series stainless steels. It is only necessary that the armature consist essentially of a ferromagnetic material, i.e., a material that the solenoid and magnet can attract. Even so, it may include parts, such as, say, a flexible tip, that are not ferromagnetic.

In operation, a coil spring 48 disposed in the armature 30's central cavity 50 bears against a cavity shoulder 52 and thereby tends to urge the armature to an extended position from the retracted position shown in the drawing. The invention can be practiced both in monostable and in bistable ("latching") versions. The illustrated embodiment's armature 30 would tend to seek the extended position in the absence of solenoid current if it were part of a monostable actuator, i.e., if the actuator did not include the magnet.

But the illustrated embodiment is of the latching variety. Its magnet keeps the armature in the retracted position once the armature has assumed that position. To drive the armature to the extended position therefore requires armature current of such a direction and magnitude that the resultant magnetic force counteracts that of the magnet by enough to allow the spring force to prevail. When it does so, the spring force moves the armature 30 to its extended position, in which it causes the membrane 40's exterior surface to seal against a valve seat 54 that the mounting block 34 forms in the conduit 44. This stops flow in the conduit 44. In this position the armature is spaced enough from the magnet that the spring force can keep the armature extended without the solenoid's help.

Now, the membrane 40 is exposed to the conduit pressure and may therefore be subject to considerable force from it.

But the solenoid 28 and spring 48 do not have to overcome this force, because the conduit's pressure is transmitted through the membrane to the incompressible fluid within the armature chamber. The force that results from the pressure within the chamber therefore balances the force that the conduit pressure exerts.

The armature 30 is free to move within the chamber between the retracted and extended positions because a port 56 formed by the armature body enables the forcebalancing fluid displaced from the armature chamber's lower well 58 to flow through the spring cavity 50 to the part of the armature chamber from which the armature's upper end has been withdrawn. Although fluid can also flow around the armature's sides, arrangements in which rapid armature motion is required should have a relatively low-flow-resistance path such as the one that the port 56 helps form. Similar considerations favor use of an armature-chamber liquid that is relativity inviscid.

To return the armature to the illustrated, retracted position and thereby permit fluid flow, current is driven through the solenoid in the direction that causes the resultant magnetic field to reinforce that of the magnet. As was explained above, the force that the magnet 22 exerts on the armature in the retracted position is great enough to keep it there against the spring force. But the armature in a monostable version, which employs no such magnet, would remain in the retracted position only so long as the solenoid conducts enough current for the resultant magnetic force to exceed the spring force.

In the illustrated embodiment the armature 30's lower end forms a narrowed tip portion 60. Thus narrowing the armature's tip reduces the armature area involved in squeezing the membrane 40 against the seat 54, and this in turn reduces the spring force required for a given upstream fluid-conduit pressure and seat-opening area. On the other hand, making the tip area too small tends to damage the mermbrane. We have found that an optimum range of tip-contact area to seat-opening area is between 1.4 and 12.3.

By simply protecting the armature with a membrane and filling the resultant cavity with a sufficiently non-corrosive liquid, the present invention enables actuator designers to make a more favorable compromises between corrosion resistance and magnetic permeability. The invention therefore constitutes a significant advance in the art.

We claim:

1. In an electromagnetic actuator comprising:
   A) a solenoid coil;
   B) an armature housing that forms an armature pocket;
   C) a flexible membrane so secured at a mouth of the pocket as to form with the armature housing a substantially fluid-tight armature chamber that contains the armature;
   D) a substantially incompressible fluid disposed in the armature chamber, and
   E) an armature including ferromagnetic material and disposed in the armature pocket for movement therein between retracted and extended armature positions in response to magnetic force exerted on the ferromagnetic material as a result of current flow through the solenoid coil, the armature so engaging the flexible membrane as to cause it to deform outward when the armature travels to its extended armature position, the armature cooperating with the incompressible fluid to fill the armature chamber and forming an interior passage, internal to the armature, through which the incompressible fluid flows as the armature moves between its extended and retracted armature positions.

2. An actuator as defined in claim 1 wherein the actuator is a latching actuator.

3. An electromagnetic actuator as defined in claim 1 further including a bias spring that is disposed in the interior passage and biases the armature toward its extended position.

4. An electromagnetic actuator as defined in claim 1 wherein:
   A) the movement therein between retracted and extended armature positions occurs in an axial direction; and
   B) the interior passage includes an axially extending portion and a radial portion, which extends from the axially extending portion through an axially extending exterior surface that the armature forms.

5. An electromagnetic actuator as defined in claim 4 further including a bias spring that is disposed in the axially extending portion of the interior passage and biases the armature toward its extended position.

6. A valve comprising:
   A) a conduit forming a fluid-flow channel providing a valve seat; and
   B) an actuator comprising:
      i) a solenoid coil;
      ii) an armature housing that forms an armature pocket;
      iii) a flexible membrane so secured at a mouth of the pocket as to form with the armature housing a substantially fluid-tight armature chamber that contains the armature;
      iv) a substantially incompressible fluid disposed in the armature chamber; and
      v) an armature including ferromagnetic material and disposed in the armature pocket for movement therein between retracted and extended armature positions in response to magnetic force exerted on the ferromagnetic material as a result of current flow through the solenoid coil, the armature so engaging the flexible membrane as to cause it to deform outward and so seal against the valve seat as to prevent fluid flow through the fluid-flow channel when the armature travels to its extended armature position, the armature cooperating with the incompressible fluid to fill the armature chamber and forming an interior passage, internal to the armature, through which the incompressible fluid flows as the armature moves between its extended and retracted armature positions.

7. A valve as defined in claim 6 wherein the actuator is a latching actuator.

8. A valve as defined in claim 6 further including a bias spring that is disposed in the interior passage and biases the armature toward its extended position.

9. A valve as defined in claim 6 wherein:
   A) the movement therein between retracted and extended armature positions occurs in an axial direction; and
   B) the interior passage includes an axially extending portion and a radial portion, which extends from the axially extending portion through an axially extending exterior surface that the armature forms.

10. A valve as defined in claim 9 further including a bias spring that is disposed in the axially extending portion of the interior passage and biases the armature toward its extended position.

* * * * *